US008996658B2

(12) United States Patent
Anbuselvan

(10) Patent No.: US 8,996,658 B2
(45) Date of Patent: Mar. 31, 2015

(54) SYSTEM AND METHOD FOR INTEGRATION OF BROWSER-BASED THIN CLIENT APPLICATIONS WITHIN DESKTOP RICH CLIENT ARCHITECTURE

(75) Inventor: Ananthalakshmi Anbuselvan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 24 days.

(21) Appl. No.: 12/203,816

(22) Filed: Sep. 3, 2008

(65) Prior Publication Data

US 2010/0057836 A1 Mar. 4, 2010

(51) Int. Cl.
*G06F 15/16* (2006.01)
*G06F 9/44* (2006.01)

(52) U.S. Cl.
CPC ........................................ *G06F 8/70* (2013.01)
USPC ............................ 709/219; 709/203; 709/218

(58) Field of Classification Search
USPC ................................................. 709/203, 218
See application file for complete search history.

(56) References Cited

U.S. PATENT DOCUMENTS

| 4,595,981 | A | 6/1986 | Leung |
| 5,659,754 | A | 8/1997 | Grove et al. |
| 5,790,778 | A | 8/1998 | Bush et al. |
| 5,850,518 | A | 12/1998 | Northrup |
| 5,946,492 | A | 8/1999 | Bates |
| 6,047,332 | A | 4/2000 | Viswanathan et al. |
| 6,078,745 | A | 6/2000 | De Greef et al. |
| 6,117,180 | A | 9/2000 | Dave et al. |
| 6,138,270 | A | 10/2000 | Hsu |
| 6,154,877 | A | 11/2000 | Ramkumar et al. |
| 6,161,219 | A | 12/2000 | Ramkumar et al. |
| 6,397,254 | B1 | 5/2002 | Northrup |
| 6,401,134 | B1 * | 6/2002 | Razavi et al. ................. 719/310 |
| 6,421,705 | B1 | 7/2002 | Northrup |
| 6,442,751 | B1 | 8/2002 | Cocchi et al. |
| 6,487,713 | B1 | 11/2002 | Cohen et al. |
| 6,546,413 | B1 | 4/2003 | Northrup |
| 6,601,233 | B1 | 7/2003 | Underwood |

(Continued)

OTHER PUBLICATIONS

Joris Claessens et al., A Tangled World Wide Web of Security Issues, First Monday, vol. 7 No. 3-4, Mar. 2002.*

(Continued)

*Primary Examiner* — Viet Vu
*Assistant Examiner* — Herman Belcher
(74) *Attorney, Agent, or Firm* — Kilpatrick Townsend & Stockton LLP

(57) ABSTRACT

Techniques for facilitating the reuse of a browser-based thin client of a client-server application in a browser-independent context. These techniques may be used, for instance, to integrate the functionality of a browser-based thin client in a desktop-based, rich client infrastructure. In one set of embodiments, these techniques include determining one or more browser dependencies that require the thin client to operate within a web browser. For example, the thin client may depend on a web browser to handle application security, the loading/caching of client-side files, the receipt/passing of application parameters, and the like. These browser dependencies are then eliminated. As a result, the thin client can be subsequently reused without the presence of a web browser. In one set of embodiments, this process is performed by a conversion utility that automatically converts program code for the browser-based thin client into program code for a browser-independent client application.

17 Claims, 6 Drawing Sheets

(56) References Cited

U.S. PATENT DOCUMENTS

| | | | |
|---|---|---|---|
| 6,671,713 B2 | 12/2003 | Northrup | |
| 6,671,746 B1 | 12/2003 | Northrup | |
| 6,779,000 B1 | 8/2004 | Northrup | |
| 6,807,636 B2 | 10/2004 | Hartman et al. | |
| 6,901,580 B2 | 5/2005 | Iwanojko et al. | |
| 6,922,675 B1 | 7/2005 | Chatterjee et al. | |
| 6,922,705 B1 | 7/2005 | Northrup | |
| 6,947,992 B1 | 9/2005 | Shachor | |
| 6,954,792 B2 | 10/2005 | Kang et al. | |
| 6,973,460 B1 | 12/2005 | Mitra | |
| 7,028,019 B2 | 4/2006 | McMillan et al. | |
| 7,062,749 B2 | 6/2006 | Cyr et al. | |
| 7,086,009 B2 | 8/2006 | Resnick et al. | |
| 7,146,607 B2 | 12/2006 | Nair et al. | |
| 7,177,878 B2 | 2/2007 | Wason | |
| 7,188,158 B1 | 3/2007 | Stanton et al. | |
| 7,203,938 B2 | 4/2007 | Ambrose et al. | |
| 7,343,360 B1 * | 3/2008 | Ristanovic et al. | 705/412 |
| 7,349,913 B2 | 3/2008 | Clark et al. | |
| 7,535,927 B1 | 5/2009 | Northrup | |
| 7,536,606 B2 | 5/2009 | Andrews et al. | |
| 7,555,712 B2 | 6/2009 | Croft et al. | |
| 7,584,207 B2 | 9/2009 | Mortensen et al. | |
| 7,603,674 B2 | 10/2009 | Cyr et al. | |
| 7,644,262 B1 | 1/2010 | Bromley et al. | |
| 7,680,752 B1 | 3/2010 | Clune, III et al. | |
| 7,685,604 B2 | 3/2010 | Baartman et al. | |
| 7,693,851 B2 | 4/2010 | Becker | |
| 7,721,158 B2 | 5/2010 | Lee | |
| 7,774,477 B2 | 8/2010 | Zintel et al. | |
| 7,783,782 B2 | 8/2010 | Cromp et al. | |
| 7,788,338 B2 | 8/2010 | Savchenko et al. | |
| 7,793,340 B2 | 9/2010 | Kiester et al. | |
| 7,827,494 B1 | 11/2010 | Hedayatpour et al. | |
| 7,840,941 B2 | 11/2010 | Brookins et al. | |
| 7,853,899 B1 | 12/2010 | Damaschke et al. | |
| 7,865,544 B2 | 1/2011 | Kordun et al. | |
| 7,895,512 B2 | 2/2011 | Roberts | |
| 7,933,946 B2 | 4/2011 | Livshits et al. | |
| 7,945,907 B2 | 5/2011 | Dreiling et al. | |
| 7,950,424 B2 | 5/2011 | Ozanne et al. | |
| 7,954,111 B2 | 5/2011 | Waguet | |
| 7,984,424 B2 | 7/2011 | Dengler et al. | |
| 7,992,130 B2 | 8/2011 | Bozza et al. | |
| 8,015,545 B2 | 9/2011 | Seto et al. | |
| 8,032,390 B2 | 10/2011 | Waguet | |
| 8,065,668 B2 | 11/2011 | Bosworth et al. | |
| 8,074,214 B2 | 12/2011 | Isaacson et al. | |
| 8,108,825 B2 | 1/2012 | Goodwin et al. | |
| 8,122,292 B2 | 2/2012 | Nanjundaswamy | |
| 8,141,064 B2 | 3/2012 | Chipman | |
| 8,166,450 B2 | 4/2012 | Fuhler et al. | |
| 8,196,125 B2 | 6/2012 | Maes | |
| 8,209,672 B2 | 6/2012 | Ivanov | |
| 8,209,675 B2 | 6/2012 | Zhao et al. | |
| 8,271,609 B2 | 9/2012 | Addala et al. | |
| 8,332,654 B2 | 12/2012 | Anbuselvan | |
| 8,423,973 B2 | 4/2013 | Saunders et al. | |
| 8,494,832 B2 | 7/2013 | Krishnan et al. | |
| 8,538,998 B2 | 9/2013 | Barrow | |
| 8,555,266 B2 | 10/2013 | Copeland et al. | |
| 8,560,938 B2 | 10/2013 | Barrow et al. | |
| 8,601,454 B2 | 12/2013 | Christophe | |
| 8,667,031 B2 | 3/2014 | Konduri et al. | |
| 8,782,604 B2 | 7/2014 | Konduri et al. | |
| 8,788,542 B2 | 7/2014 | Barrow | |
| 8,799,319 B2 | 8/2014 | Srinivasan et al. | |
| 8,856,737 B2 | 10/2014 | Kand et al. | |
| 8,869,108 B2 | 10/2014 | Utschig-Utschig et al. | |
| 8,875,306 B2 | 10/2014 | Lowes | |
| 2002/0013938 A1 | 1/2002 | Duesterwald et al. | |
| 2002/0023140 A1 * | 2/2002 | Hile et al. | 709/217 |
| 2002/0103660 A1 | 8/2002 | Cramon et al. | |
| 2002/0129060 A1 | 9/2002 | Rollins et al. | |
| 2002/0133515 A1 | 9/2002 | Kagle et al. | |
| 2002/0143735 A1 | 10/2002 | Ayi et al. | |
| 2002/0147757 A1 | 10/2002 | Day et al. | |
| 2002/0188613 A1 | 12/2002 | Chakraborty et al. | |
| 2003/0005117 A1 * | 1/2003 | Kang et al. | 709/225 |
| 2003/0023587 A1 | 1/2003 | Dennis et al. | |
| 2003/0025732 A1 | 2/2003 | Prichard | |
| 2003/0033310 A1 * | 2/2003 | Factor et al. | 707/100 |
| 2003/0034989 A1 | 2/2003 | Kondo | |
| 2003/0074653 A1 | 4/2003 | Ju et al. | |
| 2003/0084424 A1 | 5/2003 | Reddy et al. | |
| 2003/0088857 A1 | 5/2003 | Balva et al. | |
| 2003/0172127 A1 | 9/2003 | Northrup | |
| 2003/0172168 A1 | 9/2003 | Mak et al. | |
| 2003/0172193 A1 | 9/2003 | Olsen | |
| 2003/0192031 A1 | 10/2003 | Srinivasan et al. | |
| 2003/0204518 A1 | 10/2003 | Lang et al. | |
| 2003/0204645 A1 | 10/2003 | Sharma et al. | |
| 2003/0233631 A1 | 12/2003 | Curry et al. | |
| 2003/0233642 A1 | 12/2003 | Hank | |
| 2004/0046787 A1 | 3/2004 | Henry et al. | |
| 2004/0046789 A1 | 3/2004 | Inanoria | |
| 2004/0054991 A1 | 3/2004 | Harres | |
| 2004/0073565 A1 | 4/2004 | Kaufman et al. | |
| 2004/0078424 A1 | 4/2004 | Yairi et al. | |
| 2004/0111533 A1 | 6/2004 | Beisiegel et al. | |
| 2004/0111673 A1 | 6/2004 | Bowman et al. | |
| 2004/0148588 A1 | 7/2004 | Sadiq | |
| 2004/0181534 A1 | 9/2004 | Mortensen et al. | |
| 2004/0194016 A1 | 9/2004 | Liggitt | |
| 2004/0205117 A1 | 10/2004 | Hertling et al. | |
| 2004/0205765 A1 | 10/2004 | Beringer et al. | |
| 2004/0216094 A1 | 10/2004 | Bosworth et al. | |
| 2004/0230639 A1 | 11/2004 | Soluk et al. | |
| 2004/0261066 A1 | 12/2004 | Ringseth et al. | |
| 2005/0044197 A1 | 2/2005 | Lai | |
| 2005/0050527 A1 | 3/2005 | McCrady et al. | |
| 2005/0091639 A1 | 4/2005 | Patel | |
| 2005/0097503 A1 | 5/2005 | Zintel et al. | |
| 2005/0183074 A1 | 8/2005 | Alexander et al. | |
| 2005/0193061 A1 | 9/2005 | Schmidt et al. | |
| 2005/0223361 A1 | 10/2005 | Belbute | |
| 2005/0240858 A1 | 10/2005 | Croft et al. | |
| 2005/0251788 A1 | 11/2005 | Henke et al. | |
| 2005/0273772 A1 | 12/2005 | Matsakis et al. | |
| 2006/0010163 A1 | 1/2006 | Herzog et al. | |
| 2006/0015847 A1 | 1/2006 | Carroll, Jr. | |
| 2006/0031264 A1 | 2/2006 | Bosworth et al. | |
| 2006/0031750 A1 | 2/2006 | Waldorf et al. | |
| 2006/0036463 A1 | 2/2006 | Patrick et al. | |
| 2006/0075387 A1 | 4/2006 | Martin et al. | |
| 2006/0080117 A1 | 4/2006 | Carr et al. | |
| 2006/0101038 A1 | 5/2006 | Gabriel et al. | |
| 2006/0106626 A1 | 5/2006 | Jeng et al. | |
| 2006/0117073 A1 | 6/2006 | Bosworth et al. | |
| 2006/0130047 A1 | 6/2006 | Burugapalli | |
| 2006/0136832 A1 | 6/2006 | Keller et al. | |
| 2006/0143229 A1 | 6/2006 | Bou-Ghannam et al. | |
| 2006/0150156 A1 | 7/2006 | Cyr et al. | |
| 2006/0165105 A1 | 7/2006 | Shenfield et al. | |
| 2006/0168132 A1 | 7/2006 | Bunter et al. | |
| 2006/0168355 A1 | 7/2006 | Shenfield et al. | |
| 2006/0168557 A1 | 7/2006 | Agrawal et al. | |
| 2006/0184866 A1 | 8/2006 | Rees | |
| 2006/0206858 A1 | 9/2006 | Becker et al. | |
| 2006/0235733 A1 | 10/2006 | Marks | |
| 2006/0235986 A1 | 10/2006 | Kim | |
| 2006/0242636 A1 | 10/2006 | Chilimbi et al. | |
| 2006/0253490 A1 | 11/2006 | Krishna et al. | |
| 2006/0265702 A1 | 11/2006 | Isaacson et al. | |
| 2006/0271537 A1 | 11/2006 | Chandrasekharan et al. | |
| 2006/0277542 A1 | 12/2006 | Wipfel | |
| 2006/0282767 A1 | 12/2006 | Suryanarayana et al. | |
| 2006/0294474 A1 | 12/2006 | Taylor et al. | |
| 2006/0294506 A1 | 12/2006 | Dengler et al. | |
| 2007/0016429 A1 | 1/2007 | Bournas et al. | |
| 2007/0055936 A1 | 3/2007 | Dhanjal et al. | |
| 2007/0106975 A1 | 5/2007 | DeLine | |
| 2007/0113191 A1 | 5/2007 | Keller et al. | |
| 2007/0130205 A1 | 6/2007 | Dengler et al. | |

(56) References Cited

U.S. PATENT DOCUMENTS

| | | |
|---|---|---|
| 2007/0157078 A1 | 7/2007 | Anderson |
| 2007/0169199 A1 | 7/2007 | Quinnell et al. |
| 2007/0174763 A1 | 7/2007 | Chang et al. |
| 2007/0174822 A1 | 7/2007 | Moser et al. |
| 2007/0203956 A1 | 8/2007 | Anderson et al. |
| 2007/0220429 A1 | 9/2007 | Kureshy et al. |
| 2007/0240096 A1 | 10/2007 | Pontoppidan et al. |
| 2007/0245340 A1 | 10/2007 | Cohen et al. |
| 2007/0260575 A1 | 11/2007 | Robinson et al. |
| 2007/0266377 A1 | 11/2007 | Ivanov |
| 2007/0271552 A1 | 11/2007 | Pulley |
| 2007/0277095 A1 | 11/2007 | Ukigawa |
| 2007/0282885 A1 | 12/2007 | Baude et al. |
| 2007/0294586 A1 | 12/2007 | Parvathy et al. |
| 2007/0294664 A1 | 12/2007 | Joshi |
| 2008/0004887 A1 | 1/2008 | Brunswig et al. |
| 2008/0022257 A1 | 1/2008 | Baartman et al. |
| 2008/0028302 A1 | 1/2008 | Meschkat |
| 2008/0065675 A1 | 3/2008 | Bozich et al. |
| 2008/0077848 A1 | 3/2008 | Roberts |
| 2008/0083012 A1 | 4/2008 | Yu et al. |
| 2008/0104617 A1 | 5/2008 | Apacible et al. |
| 2008/0120557 A1 | 5/2008 | Offenhartz et al. |
| 2008/0126396 A1 | 5/2008 | Gagnon |
| 2008/0127087 A1 | 5/2008 | Brookins et al. |
| 2008/0127124 A1 | 5/2008 | Gilfix et al. |
| 2008/0162208 A1 | 7/2008 | Waguet |
| 2008/0162304 A1 | 7/2008 | Ourega |
| 2008/0162565 A1 | 7/2008 | Waguet |
| 2008/0163164 A1 | 7/2008 | Chowdhary et al. |
| 2008/0183479 A1 | 7/2008 | Iwashita et al. |
| 2008/0183744 A1 | 7/2008 | Adendorff et al. |
| 2008/0184201 A1 | 7/2008 | Burns et al. |
| 2008/0189358 A1* | 8/2008 | Charles ..................... 709/203 |
| 2008/0189617 A1 | 8/2008 | Covell et al. |
| 2008/0196024 A1 | 8/2008 | Barfield et al. |
| 2008/0243901 A1 | 10/2008 | Super et al. |
| 2008/0250313 A1 | 10/2008 | Kamdar et al. |
| 2008/0275844 A1 | 11/2008 | Buzsaki et al. |
| 2008/0276218 A1 | 11/2008 | Taylor et al. |
| 2008/0276260 A1 | 11/2008 | Garlick et al. |
| 2008/0295109 A1 | 11/2008 | Huang et al. |
| 2008/0313648 A1 | 12/2008 | Wang et al. |
| 2008/0320246 A1 | 12/2008 | Fuhler et al. |
| 2009/0031280 A1 | 1/2009 | Koehler |
| 2009/0083297 A1 | 3/2009 | Pohl et al. |
| 2009/0089741 A1 | 4/2009 | Bornhoevd et al. |
| 2009/0094588 A1 | 4/2009 | Chipman |
| 2009/0106494 A1 | 4/2009 | Knebel |
| 2009/0125893 A1 | 5/2009 | Copeland et al. |
| 2009/0144716 A1 | 6/2009 | Felts |
| 2009/0144729 A1 | 6/2009 | Guizar |
| 2009/0150565 A1 | 6/2009 | Grossner et al. |
| 2009/0157859 A1 | 6/2009 | Morris |
| 2009/0158237 A1 | 6/2009 | Zhang et al. |
| 2009/0158263 A1 | 6/2009 | Christophe |
| 2009/0178020 A1 | 7/2009 | Goodwin et al. |
| 2009/0204567 A1 | 8/2009 | Barrow |
| 2009/0204629 A1 | 8/2009 | Barrow |
| 2009/0204884 A1 | 8/2009 | Barrow et al. |
| 2009/0204943 A1 | 8/2009 | Konduri |
| 2009/0205013 A1 | 8/2009 | Lowes |
| 2009/0217153 A1 | 8/2009 | Oshima et al. |
| 2009/0259993 A1 | 10/2009 | Konduri et al. |
| 2009/0292797 A1 | 11/2009 | Cromp et al. |
| 2009/0313256 A1 | 12/2009 | Konduri et al. |
| 2009/0320007 A1 | 12/2009 | Krishnaswamy et al. |
| 2010/0057482 A1 | 3/2010 | Radhakrishnan et al. |
| 2010/0070553 A1 | 3/2010 | Addala et al. |
| 2010/0070973 A1 | 3/2010 | Addala et al. |
| 2010/0082556 A1 | 4/2010 | Srinivasan et al. |
| 2010/0131937 A1 | 5/2010 | Misra et al. |
| 2010/0132009 A1 | 5/2010 | Khemani et al. |
| 2010/0146291 A1 | 6/2010 | Anbuselvan |
| 2010/0162220 A1 | 6/2010 | Cui et al. |
| 2010/0236660 A1 | 9/2010 | Ozanne et al. |
| 2010/0313038 A1 | 12/2010 | Bradley |
| 2010/0332401 A1 | 12/2010 | Prahlad et al. |
| 2010/0332454 A1 | 12/2010 | Prahlad et al. |
| 2010/0333116 A1 | 12/2010 | Prahlad et al. |
| 2011/0010692 A1 | 1/2011 | Hattori et al. |
| 2011/0023071 A1 | 1/2011 | Li et al. |
| 2011/0047415 A1 | 2/2011 | Nanjundaswamy |
| 2011/0119649 A1 | 5/2011 | Kand et al. |
| 2011/0119651 A1 | 5/2011 | Utschig-Utschig et al. |
| 2011/0282829 A1 | 11/2011 | Rangaswamy et al. |
| 2012/0116980 A1 | 5/2012 | Mercuri |
| 2012/0296624 A1 | 11/2012 | Jeng et al. |
| 2013/0024424 A1 | 1/2013 | Prahlad et al. |
| 2013/0086568 A1 | 4/2013 | Krishnamurthy |
| 2014/0081896 A1 | 3/2014 | Ranganathan et al. |
| 2014/0282602 A1 | 9/2014 | Addala et al. |
| 2014/0310686 A1 | 10/2014 | Srinivasan et al. |

OTHER PUBLICATIONS

U.S. Appl. No. 12/487,004, filed Jun. 18, 2009, Srinivasan et al.

"Client-Server Modernization—From Oracle® Forms to Java," VGO Software Products, printed on Aug. 28, 2009, at URL: http://www.vgosoftware.com/products/evo/index.php; 2 pages.

"Vgo Software First to Convert Oracle Forms to Oracle ADF V11"; VGO News, printed on Aug. 28, 2009; at URL: http://www.vgosoftware.com/about/news/view_article.php?new_id=35; 2 pages.

"Oracle Forms to Java Modernization" at URL: http://www.vgosoftware.com/products/evo/walkthrough.php; VGO Software Information printed Aug. 28, 2009; 5 pages.

CipherSoft Inc, "Exodus—Main Features Benefits" Products, at URL: http://www.ciphersoftinc.com/products/expdus-features-benefits.html; printed on Aug. 28, 2009; 3 pages.

U.S. Appl. No. 12/790,437, filed May 28, 2010, Utschig-Utschig et al.

U.S. Appl. No. 12/791,445, filed May 28, 2010, Kand et al.

Dynamic Structure in ADF UIX pages, from Oracle ADF UIX Developer's Guide, pp. 1-11 downloaded from http://www.oracle.com/webapps/online-help/jdeveloper/10.1.2/state/content/navld.4/navSetld._/vtAnchor.DeltaTree/vtTopicFile.uixhelp%7Cuixdevguide%7Cdynamic%7Ehtml/ on Apr. 21, 2008.

CipherSoft Inc, "Exodus™ Products," printed on Aug. 28, 2009, at URL: http://www.ciphersoftinc.com/products/migration-products-overview.html; 3 pages.

Shepherd, et al., "Oracle SCA—The Power of the Composite," An Oracle White Paper, Aug. 2009, pp. 1-19, Oracle.

Chappell, "Introducing SCA," David Chappell & Associates, Jul. 2007, pp. 1-22.

Chapman, et al., "SCA Service Component Architecture—Client and Implementation Model Specification for WS-BPEL," Mar. 21, 2007, SCA version 1.00, 15 pages, BEA Systems, Inc.

Beisiegel, et al., "SCA Service Component Architecture—Assembly Model Specification," Mar. 15, 2007, SCA version 1.00, 91 pages, BEA Systems, Inc.

"Business Process Language (BPEL) and Oracle BPEL Process Manager," Oracle FAQ, updated Jun. 26, 2004, printed on Nov. 11, 2009, at URL: http://www.oracle.com/technology/products/ias/bpel/htdocs/orabpel_faq.html?template= . . . , 3 pages.

Non-Final Office Action for U.S. Appl. No. 12/029,605, mailed on May 12, 2010, 13 pages.

Final Office Action for U.S. Appl. No. 12/029,605, mailed on Sep. 28, 2010, 15 pages.

Non-Final Office Action for U.S. Appl. No. 12/029,609, mailed on May 26, 2010, 17 pages.

Final Office Action for U.S. Appl. No. 12/029,609, mailed on Oct. 13, 2010, 14 pages.

Non-Final Office Action for U.S. Appl. No. 12/203,816, mailed on Sep. 2, 2010, 18 pages.

Smith, Portals: Toward an Application Framework for Interoperability,: Communications of the ACM, Oct. 2004, vol. 47, No. 10, pp. 93-97.

(56) References Cited

OTHER PUBLICATIONS

Phanouriou, "UIML: A Device-Independent User Interface Markup Language," Doctoral Dissertation, Virginia Polytechnic Institute and State University, Sep. 26, 2000, 172 pages.
"File and Registry Virtualization—the good, the bad, and the ugly," Jerry's Incoherent Babbling; Windows Connected Blog; Published Dec. 19, 2005; at URL: http://windowsconnected.com/blogs/jerry/archive/2005/12/19/file-and-registry-virtualization-the-good-the-bad-and-t . . . ; 6 pages.
Non-Final Office Action for U.S. Appl. No. 12/029,600, mailed on Apr. 27, 2011, 216 pages.
Final Office Action for U.S. Appl. No. 12/029,724, mailed on May 5, 2011, 27 pages.
Final Office Action for U.S. Appl. No. 12/203,816, mailed on Jan. 20, 2011, 26 pages.
Non-Final Office Action for U.S. Appl. No. 12/138,997, mailed on Jun. 24, 2011, 19 pages.
U.S. Appl. No. 13/360,127, filed Jan. 27, 2012 by Krishnamurthy et al.
"AJAX & Security: Vulnerability in DWR Security Logic Identified Can Potentially be exploited to launce DoS attacks and break into back-end servers", published Jan. 8, 2007, AjaxWorld™ Magazine, pp. 1-4 downloaded on Oct. 6, 2008 from http://ajax.sys-con.com/node/319868, 4 pages.
"Direct Web Remoting, About DWR's Javascript Security", 4 pages downloaded from http://directwebremoting.org/dwr/security/script-tag-protection on Oct. 6, 2008.
"Direct Web Remoting, DWR version 2—New and Noteworthy", 4 pages downloaded from http://directwebremoting.org/dwrichangelog/dwr20 on Dec. 5, 2008.
"Direct Web Remoting, DWR: Easy AJAX for JAVA", 2 pages downloaded from http://directwebremoting.org/dwr/overview/dwr on Oct. 6, 2008.
"Direct Web Remoting, Safari, GET and Request Forgery", 1 page downloaded from http://directwebremoting.org/dwr/security/allowGetForSafariButMakeForgeryEasier on Oct. 6, 2008.
"Direct Web Remoting, Security", 4 pages downloaded from http://directwebremoting.org/dwr/security on Oct. 6, 2008.
"Google Web Toolkit, Product Overview", 3 pages downloaded from http://code.google.com/webtoolkit/overview.html on Oct. 6, 2008.
"Oracle Application Framework", Oracle, Dec. 2006, pp. 1-242, 242 pages.
Altenhofen et al., "ASMs in Service Oriented Architectures", Journal of Universal Computer Science, vol. 14, No. 12, 2008, 25 pages.
Box et al., "Web Services Addressing (WS-Addressing)" Aug. 10, 2004, 23 pages, http://www.w3.orq/Submission/ws-addressing/#_Toc77464317, printed on Aug. 18, 2009, 23 pages.
Carey, "Making BPEL Processes Dynamic" Oracle Technology Network, 8 pages, printed on Aug. 18, 2009, 8 pages.
Claypool et al., "Optimizing Performance of Schema Evolution Sequences", Objects and Databases [online], 2000 [retrieved Feb. 7, 2012], retrieved from Internet: http://se-pubs.dbs.uni-leipzig.de/files/Claypool2000OptimizingPerformanceofSchemaEvolutionSequences.pdf, pp. 114-127, 14 pages.
Curphey et al., "Web Application Security Assessment Tools", IEEE, 2006, pp. 32-41, 10 pages.
Dipaola et al., "Subverting Ajax", Dec. 2006, 23rd CCC Conference, pp. 1-8, 8 pages.
Hohpe et al., "Messaging Systems" Enterprise Integration Patterns 2004, pp. 57-97, Chapter 3, Pearson Education, Inc, Boston, Massachusetts, 45 pages.
Nagappan et al., "XML Processing and Data Binding with Java APIs" in: Developing Java Web Services: Architecting and Developing Secure Web Services Using Java [online], 2003 [retrieved Feb. 7, 2012], retrieved from Internet: http://java.sun.com/developer/Books/j2ee/devjws/, pp. 313-399, 89 pages.
Steinberg, "Data Binding with JAXB" [online], 2003 [retrieved Feb. 7, 2012], retrieved from Internet: https://www6.software.ibm.com/developerworks/education/x-jabx/x-jaxb-a4.pdf, pp. 1-34, 34 pages.
Non-Final Office Action for U.S. Appl. No. 12/210,657 mailed on Apr. 25, 2011, 21 pages.
Non-Final Office Action for U.S. Appl. No. 12/210,657 mailed on Sep. 30, 2011, 21 pages.
Non-Final Office Action for U.S. Appl. No. 12/212,599 mailed on Dec. 22, 2011, 10 pages.
Non-Final Office Action for U.S. Appl. No. 12/330,008 mailed on Dec. 21, 2011, 14 pages.
Non-Final Office Action for U.S. Appl. No. 12/029,615 mailed on Feb. 15, 2012, 27 pages.
Final Office Action for U.S. Appl. No. 12/101,420 mailed on Feb. 24, 2012, 20 pages.
Final Office Action for U.S. Appl. No. 12/487,004 mailed on Mar. 19, 2012, 30 pages.
Final Office Action for U.S. Appl. No. 12/210,657 mailed on Apr. 3, 2012, 23 pages.
Final Office Action for U.S. Appl. No. 12/330,008 mailed on Apr. 10, 2012, 13 pages.
Zhang, et al., "Schema Based XML Security: RBAC Approach," Machine Simulator, Third International Conference on Computer Assisted Learning, Published 2003, at URL: http://citeseerx.ist.psu.edu/viewdoc/summary?doi=10.1.1.3.6016, pp. 1-15.
Non-Final Office Action for U.S. Appl. No. 12/029,724, mailed on Dec. 14, 2010, 43 pages.
Hildebrandt, G., "Web-based Document Management", Apr. 2001, 22 pages.
Shang-Pin Ma, "Discovery-Based Service Composition, "National Central University, Doctoral Dissertation. Jan. 2007, 109 pages.
Yang et al., "Web Component: A Substrate for Web Service Reuse and Composition". Proc. 14th Conf. Advanced Information Systems Eng. (CAiSE 02), LNCS 2348, Springer-Verlag, 2002, 16 pages.
Non-Final Office Action for U.S. Appl. No. 12/029,605, mailed on Jul. 20, 2011, 12 pages.
Non-Final Office Action for U.S. Appl. No. 12/101,420, mailed on Oct. 5, 2011, 18 pages.
Final Office Action for U.S. Appl. No. 12/029,600, mailed on Oct. 19, 2011, 20 pages.
Final Office Action for U.S. Appl. No. 12/029,605, mailed on Nov. 2, 2011, 13 pages.
Final Office Action for U.S. Appl. No. 12/029,609, mailed on Nov. 8, 2011, 13 pages.
Final Office Action for U.S. Appl. No. 12/138,997, mailed on Dec. 5, 2011, 13 pages.
Non-Final Office Action for U.S. Appl. No. 12/487,004, mailed on Sep. 28, 2011, 29 pages.
Notice of Allowance for U.S. Appl. No. 12/210,657 mailed on Jun. 26, 2012, 6 pages.
Notice of Allowance for U.S. Appl. No. 12/330,008 mailed on Jun. 11, 2012, 7 pages.
Final Office Action for U.S. Appl. No. 12/029,615 mailed on Jul. 31, 2012, 33 pages.
Notice of Allowance for U.S. Appl. No. 12/330,008 mailed on Aug. 7, 2012, 17 pages.
Mietzner, et al., "Defining Composite Configurable SaaS Application Packages Using SCA Variability Descriptors and Multi-Tenancy Patterns,", 2008, pp. 156-161.
Phillips, Josh. Window's Connected UseriD: Jerry. Jerry's Incoherent Babbling: ""File and Registry Virtualization—the good, the bad, and the ugly"". <http:/ /wi ndowsco n nected. co m/b logs/jerry/archive/2005/ 12/1 9/fi l e-and-reg istry-vi rtual izatio n-th e-good-th ebad- and-the-ugly.aspx>. Published: Dec. 19, 2005."
Non-Final Office Action for U.S. Appl. No. 12/029,724 mailed on Jan. 7, 2013, 39 pages.
Final Office Action for U.S. Appl. No. 12/029,724 mailed on Apr. 30, 2013, 33 pages.
Terminal Disclaimer—Approved for U.S. Appl. No. 12/029,600 mailed on Oct. 25, 2011, 1 page.
Non-Final Office Action for U.S. Appl. No. 12/029,600 mailed on Sep. 17, 2012, 38 pages.
Notice of Allowance for U.S. Appl. No. 12/029,600 mailed on Nov. 7, 2012, 16 pages.
Notice of Allowance for U.S. Appl. No. 12/029,600 mailed on Feb. 5, 2013, 16 pages.

(56) References Cited

OTHER PUBLICATIONS

Non-Final Office Action for U.S. Appl. No. 12/029,605 mailed on Apr. 10, 2013, 38 pages.
Non-Final Office Action for U.S. Appl. No. 12/029,609 mailed on Jul. 28, 2011, 29 pages.
Notice of Allowance for U.S. Appl. No. 12/029,609 mailed on Feb. 4, 2013, 52 pages.
Non-Final Office Action for U.S. Appl. No. 12/212,599 mailed on Aug. 2, 2012, 18 pages.
Advisory Action for U.S. Appl. No. 12/487,004 mailed on May 24, 2012, 5 pages.
Advisory Action for U.S. Appl. No. 12/029,615 mailed on Oct. 16, 2012, 5 pages.
Non-Final Office Action for U.S. Appl. No. 12/790,437 mailed on Jan. 30, 2013, 31 pages.
Non-Final Office Action for U.S. Appl. No. 12/790,445 mailed on Dec. 19, 2012, 30 pages.
U.S. Appl. No. 12/029,724, Notice of Allowance mailed on Jun. 24, 2014, 13 pages.
U.S. Appl. No. 12/790,437, Notice of Allowance mailed on Jun. 12, 2014, 5 pages.
U.S. Appl. No. 12/790,445, Notice of Allowance mailed on Jun. 4, 2014, 5 pages.
U.S. Appl. No. 12/029,605, Notice of Allowability mailed on May 28, 2014, 2 pages.
U.S. Appl. No. 12/029,615, Notice of Allowance mailed on Oct. 2, 2014, 16 pages.
U.S. Appl. No. 12/029,724, Advisory Action mailed on Aug. 12, 2013, 2 pages.
U.S. Appl. No. 12/212,599, Corrected Notice of Allowability mailed on Sep. 25, 2014, 3 pages.
U.S. Appl. No. 12/212,599, Notice of Allowance mailed on Jul. 15, 2014, 5 pages.
U.S. Appl. No. 12/487,004, Notice of Allowability mailed on Jun. 16, 2014, 2 pages.
U.S. Appl. No. 12/790,437, Supplemental Notice of Allowability mailed on Aug. 13, 2014, 2 pages.
Vesperman, Essential CVS, O'Reilly Media Inc., Jun. 9, 2003.
U.S. Appl. No. 12/029,615, Non-Final Office Action mailed on Mar. 21, 2014, 29 pages.
U.S. Appl. No. 12/101,420, Notice of Allowance mailed on Mar. 17, 2014, 8 pages.
U.S. Appl. No. 13/360,127, Non-Final Office Action mailed on Apr. 22, 2014, 16 pages.
Chappell et al., Ready for Primetime: The Next-Generation, Grid-Enabled Service-Oriented Architecture, SOA—The SOA Magazine, Sep. 3, 2007, pp. 1-10.
U.S. Appl. No. 12/212,599, Notice of Allowance mailed on Feb. 7, 2014, 5 pages.
U.S. Appl. No. 12/487,004, Final Office Action mailed on Dec. 27, 2013, 18 pages.
U.S. Appl. No. 12/790,437, Non-Final Office Action mailed on Dec. 30, 2013, 15 pages.
U.S. Appl. No. 12/790,445, Non-Final Office Action mailed on Dec. 31, 2013, 13 pages.
U.S. Appl. No. 12/029,605, Notice of Allowance mailed on Mar. 3, 2014, 9 pages.
U.S. Appl. No. 12/487,004, Notice of Allowance mailed on Mar. 6, 2014, 5 pages.
Chen et. al., Feature Analysis for Service-Oriented Reengineering, IEEE 12th ASIA-PACIFIC Software Engineering Conference (APSEC 2005), Dec. 2005, Taipei, Taiwan.
U.S. Appl. No. 12/029,600, Notice of Allowance mailed on Jun. 11, 2013, 6 pages.
U.S. Appl. No. 12/029,605, Final Office Action mailed on Sep. 6, 2013, 19 pages.
U.S. Appl. No. 12/029,609, Notice of Allowance mailed on May 29, 2013, 14 pages.
U.S. Appl. No. 12/029,615, Final Office Action Response filed on Sep. 24, 2012, 11 pages.
U.S. Appl. No. 12/101,420, Notice of Allowance mailed on Aug. 28, 2013, 9 pages.
U.S. Appl. No. 12/212,599, Corrected Notice of Allowance mailed on Oct. 2, 2013, 4 pages.
U.S. Appl. No. 12/212,599, Notice of Allowance mailed on Jun. 19, 2013, 6 pages.
U.S. Appl. No. 12/330,008, Final Office Action Response filed on May 24, 2012, 11 pages.
U.S. Appl. No. 12/487,004, Final Office Action Response filed on May 15, 2012, 16 pages.
U.S. Appl. No. 12/487,004, Non Final Office Action mailed on Sep. 24, 2013, 22 pages.
U.S. Appl. No. 12/790,437, Final Office Action mailed on Jul. 12, 2013, 12 pages.
U.S. Appl. No. 12/790,445, Final Office Action mailed on Jul. 5, 2013, 10 pages.
Cetin et al., A mashup-based strategy for migration to service-oriented computing, IEEE International Conference on Pervasive Services, IEEE, Jul. 20, 2007.
Li et al., Leveraging legacy codes to distributed problem-solving environments: a Web services approach, Software: Practice and experience, vol. 34, No. 13, 2004, pp. 1297-1309.
Li et al., SGrid: a service-oriented model for the Semantic Grid, Future Generation Computer Systems, vol. 20, No. 1, 2004, pp. 7-18.
Sneed et al., Integrating legacy software into a service oriented architecture, Software Maintenance and Reengineering, CSMR, IEEE, 2006.
U.S. Appl. No. 12/138,997, Notice of Allowance mailed on Nov. 27, 2013, 13 pages.
U.S. Appl. No. 12/029,605, Advisory Action mailed on Dec. 18, 2013, 4 pages.
Oracle BPEL 10g Purging Strategies, An Oracle White Paper, Oracle, Aug. 2010, 21 pages.
Oracle SOA Suite 11g: Essential Concepts, vol. I—Student Guide, Edition 1.0, Oracle, Sep. 2010, pp. 8-18 to 8-21.
Bohn et al., WS-BPEL Process Compiler for Resource-Constrained Embedded Systems, 22nd International Conference on Advanced Information Networking and Applications, IEEE, 2008, pp. 1387-1392.
U.S. Appl. No. 13/360,127, Notice of Allowance mailed on Nov. 4, 2014, 10 pages.

\* cited by examiner

SYSTEM AND METHOD FOR INTEGRATION OF BROWSER-BASED THIN CLIENT APPLICATIONS WITHIN DESKTOP RICH CLIENT ARCHITECTURE

BACKGROUND OF THE INVENTION

Embodiments of the present invention relate to computer software, and more particularly relate to techniques for facilitating the reuse of a browser-based thin client of a client-server application in a browser-independent context.

In the late 1980's and early 1990's, many business applications were developed using a "thick client"-based client-server architecture. These applications, which included both a client-side and server-side component, were structured so that the client-side component (i.e., thick client) performed the bulk of the application processing (e.g., user interface generation, logic processing, etc.). An example of such a thick client-based application is Oracle Forms, developed by Oracle Corporation.

As the Internet grew in popularity in the mid to late 1990's, many organizations re-architected their existing, thick client-based applications so that they could be accessed via the World Wide Web (WWW). This process generally involved moving functions previously performed by the thick client to a middle tier layer running on a server-side machine. This allowed users to access the application via a lightweight "thin client" running in a standard web browser. In these implementations, the thin client was typically a JAVA applet or some other type of browser-based software component, and was configured to perform relatively simple tasks such as presenting user interfaces generated by the server, capturing user inputs, and the like.

Now there is a growing trend towards building browser-independent composite applications. These applications do not require a web browser, and enable users to view and interact with user interfaces from one or more component applications. For example, one type of browser-independent composite application may incorporate user interfaces from one or more legacy client-server applications. To achieve this, it would be advantageous to reuse existing browser-based thin clients for the legacy client-server applications in the context of the browser-independent composite application.

However, reusing a browser-based thin client in a browser-independent context is challenging for several reasons. For example, in many cases, existing browser-based thin clients depend on web browser features (i.e., cookies, HTML forms, etc.) to handle security for interacting with their respective servers. In further cases, existing browser-based thin clients depend on the host web browser to handle the loading and caching of files, the receipt and passing of application parameters, and other functions.

Accordingly, it would be desirable to have techniques for reusing a browser-based thin client of a client-server application that overcome the challenges above.

BRIEF SUMMARY OF THE INVENTION

Embodiments of the present invention provide techniques for facilitating the reuse of a browser-based thin client of a client-server application in a browser-independent context. These techniques may be used, for instance, to integrate the functionality of a browser-based thin client in a desktop-based, rich client infrastructure. In one set of embodiments, these techniques include determining one or more browser dependencies that require the thin client to operate within a web browser. For example, the thin client may depend on a web browser to handle application security, the loading/caching of client-side files, the receipt/passing of application parameters, and the like. These browser dependencies are then eliminated. As a result, the thin client can be subsequently reused without the presence of a web browser. In one set of embodiments, this process is performed by a conversion utility that automatically converts program code for the browser-based thin client into program code for a browser-independent client application.

According to one embodiment of the present invention, a method for facilitating the reuse of a browser-based thin client of a client-server application in a browser-independent context is provided. The method comprises receiving program code for the browser-based thin client, and converting the program code for the browser-based thin client into program code for a browser-independent client application. The converting comprises determining one or more browser dependencies that require the browser-based thin client to operate within a web browser in order to interact with a server side of the client-server application, and eliminating the one or more browser dependencies. In an embodiment, the converting is performed in an automated fashion (i.e., with minimal or no human intervention).

In one set of embodiments, the browser-based thin client may be a JAVA applet or an ActiveX control. Further, the browser-independent client application may be a desktop-based rich client application, or a web service. In a specific embodiment, the client-server application is Oracle Forms.

In one set of embodiments, the browser-based thin client is dependent on the web browser to handle application security when interacting with the server side of the client-server application. In these embodiments, the step of eliminating the one or more browser dependences includes eliminating the dependency on the web browser to handle said application security. In one embodiment, this dependency can be eliminated by creating an authentication and authorization handlers in the browser-independent client application, wherein the authentication and authorization handlers perform authentication and/or authorization duties on behalf of the browser-independent client application that were previously performed by the web browser on behalf of the browser-based thin client. The authentication duties may include, for example, authenticating a user attempting to login to the client-server application. The authorization duties may include, for example, determining whether a user is authorized to perform a function via the client-server application.

In one set of embodiments, the authentication and authorization handlers include generic authentication and authorization Application Programming Interfaces (APIs) respectively. At runtime of the browser-independent client application, the generic authentication and/or authorization APIs are automatically invoked when authentication or authorization is required. In some embodiments, the generic authentication and authorization APIs may be configured to invoke one or more external security APIs that are external to the browser-independent client application, such as an authentication or authorization operation provided by an external security/identity service.

In one set of embodiments, the browser-based thin client is dependent on the web browser to download and cache one or more files (e.g., JAVA Archive files) necessary for accessing the server side of the client-server application. In these embodiments, the step of eliminating the one or more browser dependences includes eliminating the dependency on the web browser to download and cache said one or more files.

In one set of embodiments, the browser-based thin client is dependent on the web browser to receive one or more execution parameters necessary for accessing the server side of the client-server application. In these embodiments, the step of eliminating the one or more browser dependences includes eliminating the dependency on the web browser to receive said one or more execution parameters. By way of example, the execution parameters may be performance-related parameters, user interface-related parameters, and/or login-related parameters.

According to another embodiment of the present invention, a system for facilitating the reuse of a browser-based thin client of a client-server application in browser-independent context is provided. The system comprises a storage component configured to store program code for the browser-based thin client, and a processing component in communication with the storage component. In various embodiments, the processing component is configured to receive the program code for the browser-based thin client, and convert the program code for the browser-based thin client into program code for a browser-independent client application. The converting comprise determining one or more browser dependencies that require the browser-based thin client to operate within a web browser in order to interact with a server side of the client-server application, and eliminating the one or more browser dependencies. In an embodiment, the converting is performed in an automated fashion (i.e., with minimal or no human intervention).

According to another embodiment of the present invention, a machine-readable medium for a computer system is disclosed. The machine-readable medium has stored thereon a series of instructions which, when executed by a processing component, cause the processing component to facilitate the reuse of a browser-based thin client of a client-server application in a browser-independent context by receiving program code for the browser-based thin client, and converting the program code for the browser-based thin client into program code for a browser-independent client application. The converting comprises determining one or more browser dependencies that require the browser-based thin client to operate within a web browser in order to interact with a server side of the client-server application, and eliminating the one or more browser dependencies. In an embodiment, the converting is performed in an automated fashion (i.e., with minimal or no human intervention).

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

In the drawings, the use of like reference numbers in different drawings indicates similar components.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details.

Embodiments of the present invention provide techniques for facilitating the reuse of a browser-based thin client of a client-server application in a browser-independent context. The techniques described herein are particularly applicable to integrating browser-based thin clients in desktop-based, rich client applications, such as desktop-based composite applications. However, it should be appreciated that these techniques may be used to integrate browser-based thin clients in any kind of software environment or infrastructure that does not incorporate a web browser. Merely by way of example, these techniques may be used to package the functionality exposed by a browser-based thin client as a web service.

Further, it should be appreciated that the techniques of the present invention may be used to facilitate the reuse of any type of browser-based thin client (corresponding to any type of client-server application) in a browser-independent context. In a specific set of embodiments, the techniques described herein may be used to facilitate the reuse of browser-based thin clients for Oracle Forms-based applications.

Figure 1:
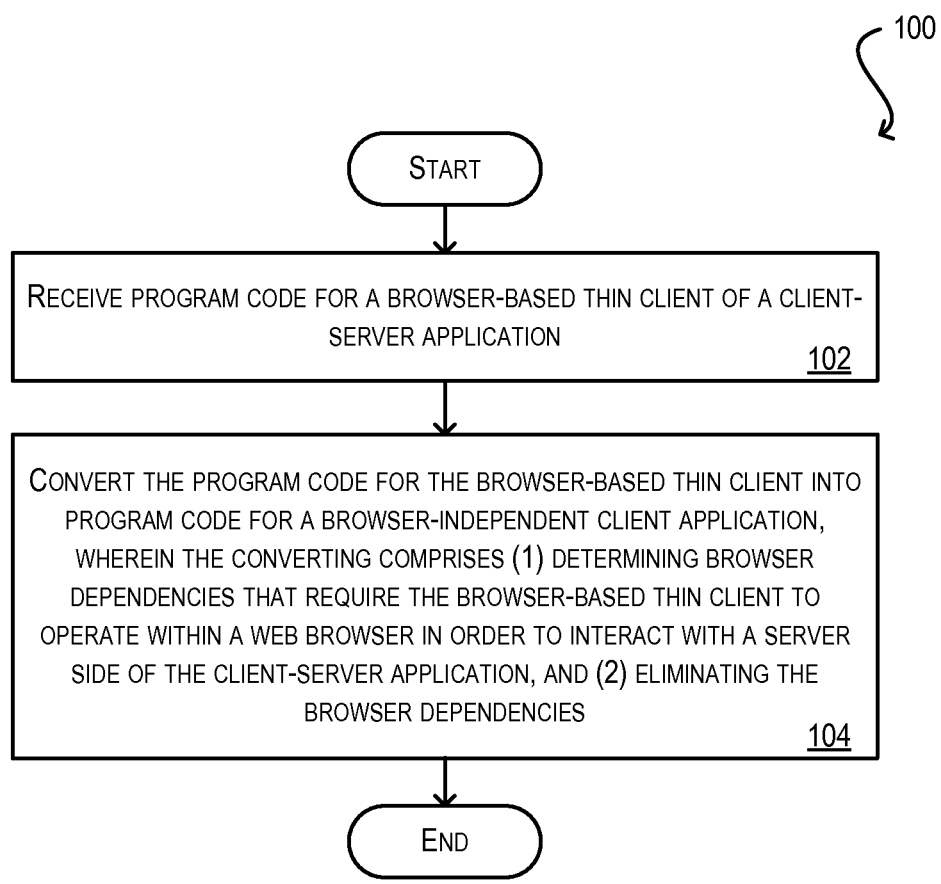
FIG. 1 is a flowchart illustrating steps performed in facilitating the reuse of a browser-based thin client in a browser-independent context in accordance with an embodiment of the present invention.

FIG. 1 is a flowchart 100 illustrating the steps performed in facilitating the reuse of a browser-based thin client in a browser-independent context in accordance with an embodiment of the present invention. In various embodiments, the processing of flowchart 100 may be implemented in software, hardware, or combinations thereof. For example, as software, the processing of flowchart 100 may be implemented as part of an automated software conversion utility. This software may be stored on a machine-readable medium. As hardware, embodiments of flowchart 100 may be programmed into a field-programmable gate array (FPGA) or fabricated as an application-specific integrated circuit (ASIC). One of ordinary skill in the art would recognize many variations, modifications, and alternatives.

At step 102, program code for a browser-based thin client of a client-server application is received. In one set of embodiments, the browser-based thin client is implemented as a JAVA applet. In other embodiments, the browser-based thin client is implemented as an ActiveX control, or any other type of browser-based component. The client-server application may be based on any type of client-server technology such as Oracle Forms or the like.

At step 104, the program code for the browser-based thin client is converted into program code for a browser-independent client application. In other words, the browser-based thin client is converted into an application that is no longer dependent on the presence of a web browser in order to function. As discussed above, the browser-independent client application may be a desktop-based rich client application, such as a desktop-based composite application. The browser-independent client application may also be a web service that can be invoked from a Business Process Execution Language (BPEL) process. In various embodiments, the program code conversion described at step 104 is performed by a software conversion utility. In a specific embodiment, the software conversion utility is capable of performing this conversion in an automated fashion (i.e., with minimal, or no, human intervention).

It should be noted that prior art mechanisms exist for running a JAVA applet as a standalone JAVA application. For example, a JAVA applet can be converted into a standalone JAVA application by manually changing the code structure of the applet in a defined manner. However, these existing mechanisms fail to address the functional dependencies that an applet (or any other type of browser-based thin client) may have with respect to its host web browser.

To overcome these deficiencies in the prior art, the conversion performed at step 104 includes (1) determining browser dependencies that require the browser-based thin client to operation within a web browser in order to interact with a server-side of the client-server application, and (2) eliminating the one or more browser dependencies. In some scenarios, the browser-based thin client may be dependent on its host web browser to handle application security when interacting with the server-side of the application. For example, in the case of Oracle Forms, an application user is typically authenticated and/or authorized via an HTML form-based interface prior to initialization of the thin client, and the authenticated/authorized credentials of the user are maintained in a browser cookie. In these scenarios, embodiments of the present invention detect and eliminate this browser dependency by integrating security handling directly into the program code of the browser-independent client application. This process of integrating security handling is described in greater detail with respect to FIG. 2 below.

In other scenarios, the browser-based thin client may be dependent on its host web browser to download and/or cache one or more client-side files necessary for execution. For example, in the case of a JAVA applet-based thin client, the applet may rely on the browser to download and cache JAVA Archive (JAR) files that are needed to run the applet. In these scenarios, embodiments of the present invention detect and eliminate this browser dependency by automatically handling the download and caching of such files within the browser-independent client application.

In yet other scenarios, the browser-based thin client may be dependent on its host web browser to receive/pass one or more execution parameters from/to the server-side of the application. For example, these parameters may be received or passed as values within an HTTP URL, and may include performance-related parameters (e.g., Java Virtual Machine parameters), login-related parameters (e.g., username, password, etc.), user interface-related parameters (e.g., UI dimensions, etc.), and/or session-related parameters (e.g., session ID, etc.). In these scenarios, embodiments of the present invention detect and eliminate this dependency by automatically receiving/sending these parameters from/to the server-side of the application from the context of the browser-independent client application.

It should be appreciated that the specific steps illustrated in FIG. 1 provide a particular method for facilitating the reuse of a browser-based thin client in a browser-independent context according to an embodiment of the present invention. Other sequences of steps may also be performed according to alternative embodiments. For example, the individual steps illustrated in FIG. 1 may include multiple sub-steps that may be performed in various sequences as appropriate to the individual step. Furthermore, additional steps may be added, or existing steps may be removed, depending on the particular application. One of ordinary skill in the art would recognize many variations, modifications, and alternatives.

Figure 2:
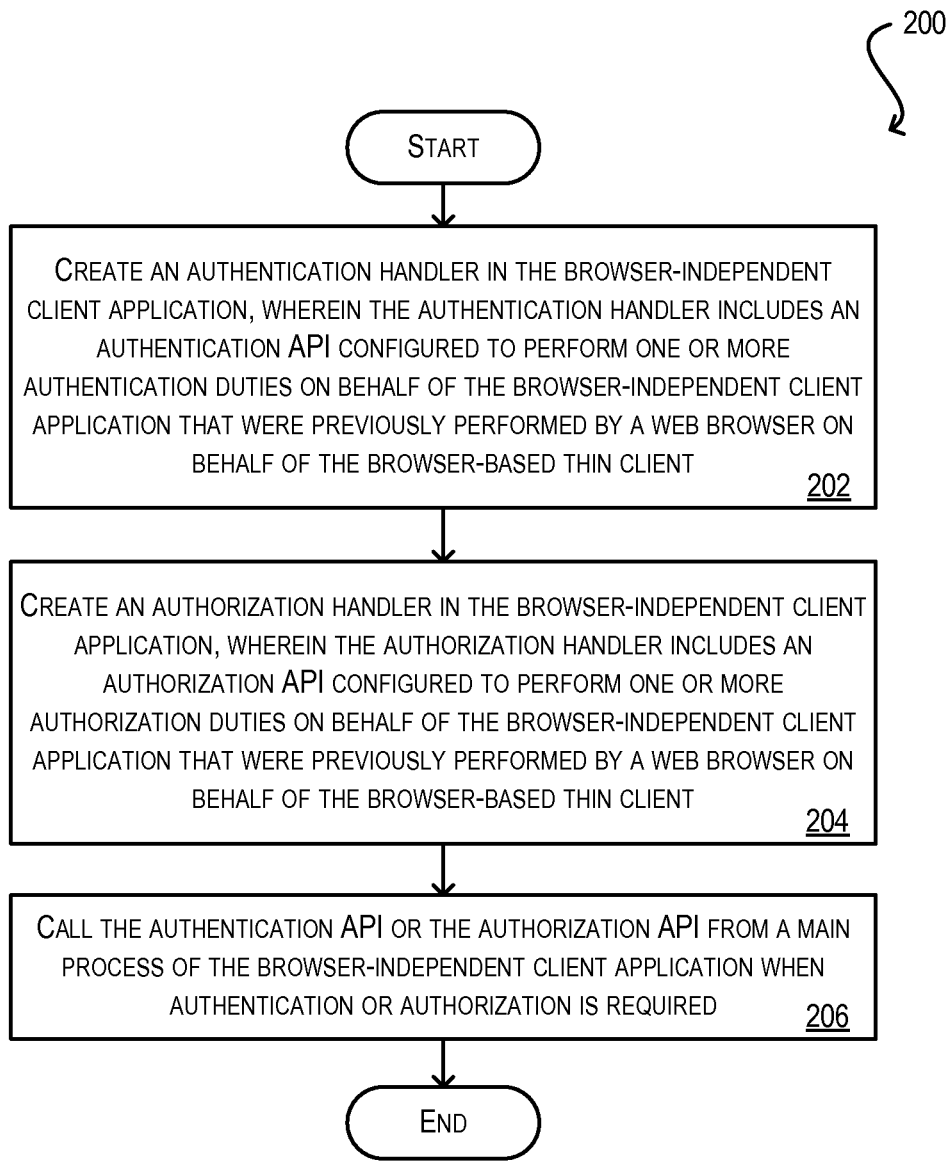
FIG. 2 is a flowchart illustrating steps performed in handling security in a browser-independent client application in accordance with an embodiment of the present invention.

FIG. 2 is a flowchart 200 illustrating the steps performed in handling security in a browser-independent client application in accordance with an embodiment of the present invention. As described with respect to flowchart 100 of FIG. 1, a browser-based thin client may depend on a web browser for handling the security needed to interact with the server-side of the application. Flowchart 200 describes how this application security can be automatically integrated into the browser-independent client application created in step 104 of flowchart 100, thereby eliminating this particular browser dependency. In various embodiments, the processing of flowchart 200 may be implemented in software, hardware, or combinations thereof. For example, as software, the processing of flowchart 200 may be implemented as part of the automated software conversion utility described above.

At step 202, an authentication handler is created in the browser-independent client application, where the authentication handler includes an authentication API configured to perform one or more authentication functions on behalf of the browser-independent client application that were previously performed by a web browser on behalf of the browser-based thin client. For example, assume that the browser-based thin client relied on the web browser to authenticate a user via an HTML form-based interface. Further, assume that the thin client relied on the web browser to maintain the authenticated credentials of the user in a browser cookie. In this case, the authentication API created in the browser-independent client application would take care of authenticating the user, and the authentication handler would maintain the authenticated credentials of the user in a data structure directly within the browser-independent client application. Thus, the browser is no longer needed for authentication purposes.

Similarly, at step 204, an authorization handler is created in the browser-independent client application, where the authorization handler includes an authorization API configured to perform one or more authorization functions on behalf of the browser-independent client application that were previously performed by a web browser on behalf of the browser-based thin client. For example, assume that the browser-based thin client relied on the web browser to authorize the user via an HTML form-based interface. Further, assume that the thin client relied on the web browser to maintain the authorized credentials of the user in a browser cookie. In this case (like the authentication example above), the authorization API created in the browser-independent client application would take care of authorizing the user, and the authorization handler would maintain the authorized credentials of the user in a data structure directly within the browser-independent client application. Thus, the browser is no longer needed for authorization purposes.

It should be noted that although the authentication and authorization handlers of steps 202 and 204 are described as two separate handlers, they may be combined into a single handler that performs combined authentication/authorization functions. Moreover, either the authentication handler or the authorization handler may be excluded depending on the needs of a particular application. One of ordinary skill in the art would recognize many variations, modifications, and alternatives.

Once the handlers are created, their corresponding APIs may be called from a main process of the browser-independent client application when authentication and/or authorization is required (step 206). For example, the authentication and/or authorization APIs may be called to ensure that the user has appropriate security credentials before allowing the user to login, or to perform a particular function via the application. In one set of embodiments, the authentication and authorization APIs are easily configurable by a developer of the browser-independent client application. In this manner, they can be modified to call different security APIs and/or services as security requirements change. In a specific embodiment, the authentication and/or authorization APIs are configured to call one or more external security APIs that are external to the browser-independent client application (e.g., an authentication/authorization operation exposed by an external security/identity service).

It should be appreciated that the specific steps illustrated in FIG. 2 provide a particular method for handling security in a browser-independent client application according to an embodiment of the present invention. Other sequences of steps may also be performed according to alternative embodiments. For example, the individual steps illustrated in FIG. 2 may include multiple sub-steps that may be performed in various sequences as appropriate to the individual step. Furthermore, additional steps may be added, or existing steps may be removed, depending on the particular application. One of ordinary skill in the art would recognize many variations, modifications, and alternatives.

Figure 3:
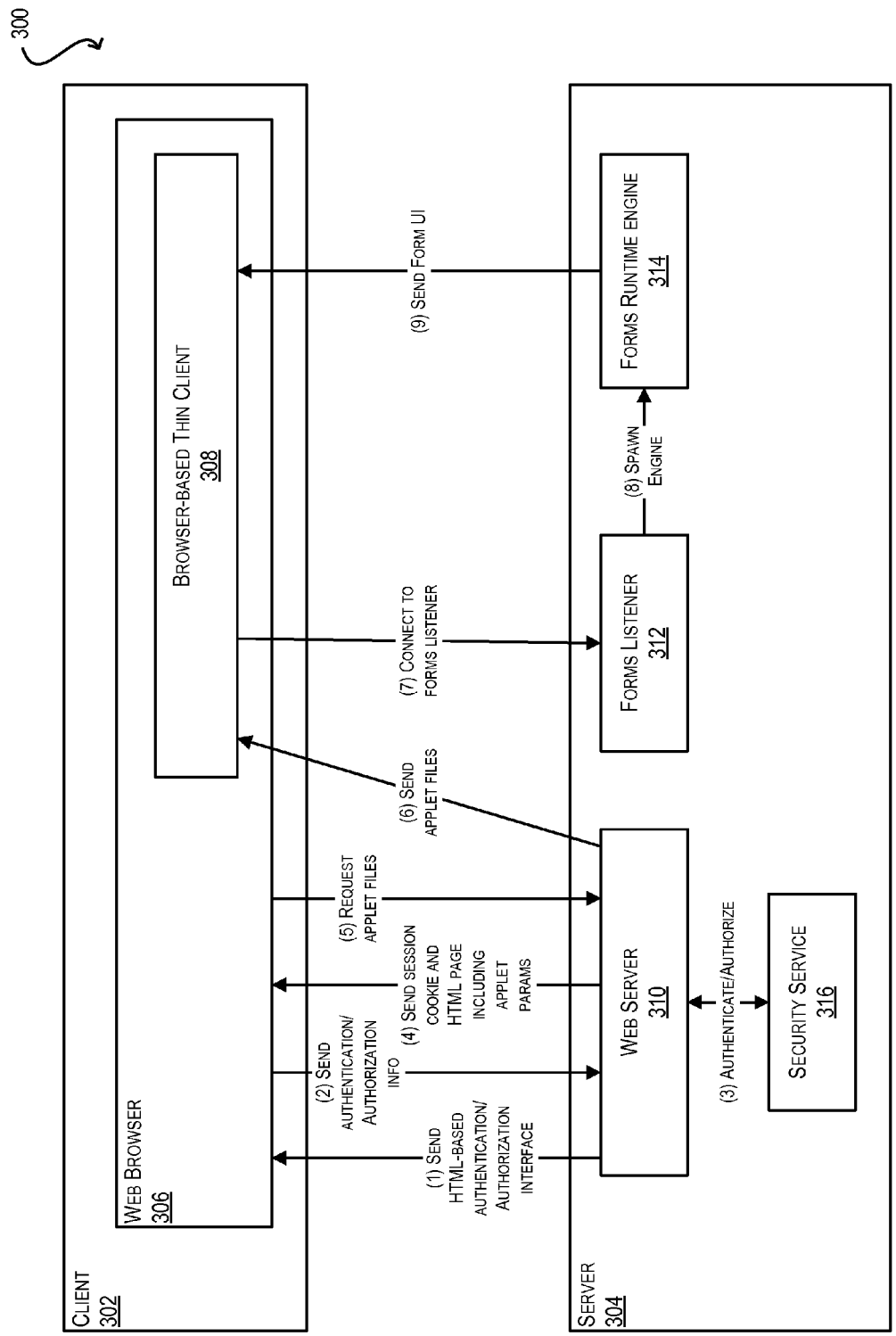
FIG. 3 is a flow diagram illustrating steps performed in establishing a session between a browser-based thin client and a server component of an Oracle Forms-based client-server application.

FIG. 3 is a flow diagram 300 illustrating the steps performed in establishing a session between a browser-based thin client and a server component of an Oracle Forms-based client-server application. In particular, flow diagram 300 illustrates some of the browser dependencies (e.g., security dependencies, file loading/caching dependencies, parameter passing dependencies, etc.) that the thin client may typically have when interacting with the server component of the application. As shown, flow diagram 300 includes a client 302 running a web browser 306. The web browser, in turn, runs a browser-based thin client 308. Client 302 is communicatively coupled with a server 304 that includes a web server 310, Oracle Forms listener 312, Oracle Forms runtime engine 314, and a security service 316. Although only a single server 304 is shown, it should be appreciated that server components 310, 312, 314, 316 may be configured to run on separate servers. Further, although only one client 302 is shown, it should be appreciated that any number of clients may communicate with server 304.

At steps (1), (2), (3), (4), web browser 306, web server 310, and security service 316 interact to authenticate and/or authorize a user at client 302. In particular, web server 310 sends an HTML form-based security interface to web browser 306 (step (1)), web browser 306 sends authentication/authorization info to web server 310 (step (2)), security service 316 authenticates/authorizes the user based on the received info (step (3)), and web server 310 sends a session cookie (comprising a security token) and an HTML page including applet parameters to web browser 306 (step (4)). Note that since this interaction is performed via web browser 306 rather than browser-based thin client 308, thin client 308 is necessarily dependent on web browser 306 to handle security.

Once the user has been authenticated/authorized, web browser 306 may request one or more client-side files (e.g., applet files) that are needed to run thin client 308 (step (5)). These files are sent by web browser 310 (step (6)), and subsequently loaded and cached by web browser 306.

At step (7), thin client 308 is initiated and connects to Forms listener 312. As part of this connection process, web browser 306 takes care of passing appropriate execution parameters to the Forms listener. Forms listener 312 then spawns an instance of Forms runtime engine 314, which sends the appropriate Forms UI to thin client 308 (step (9)).

Figure 4:
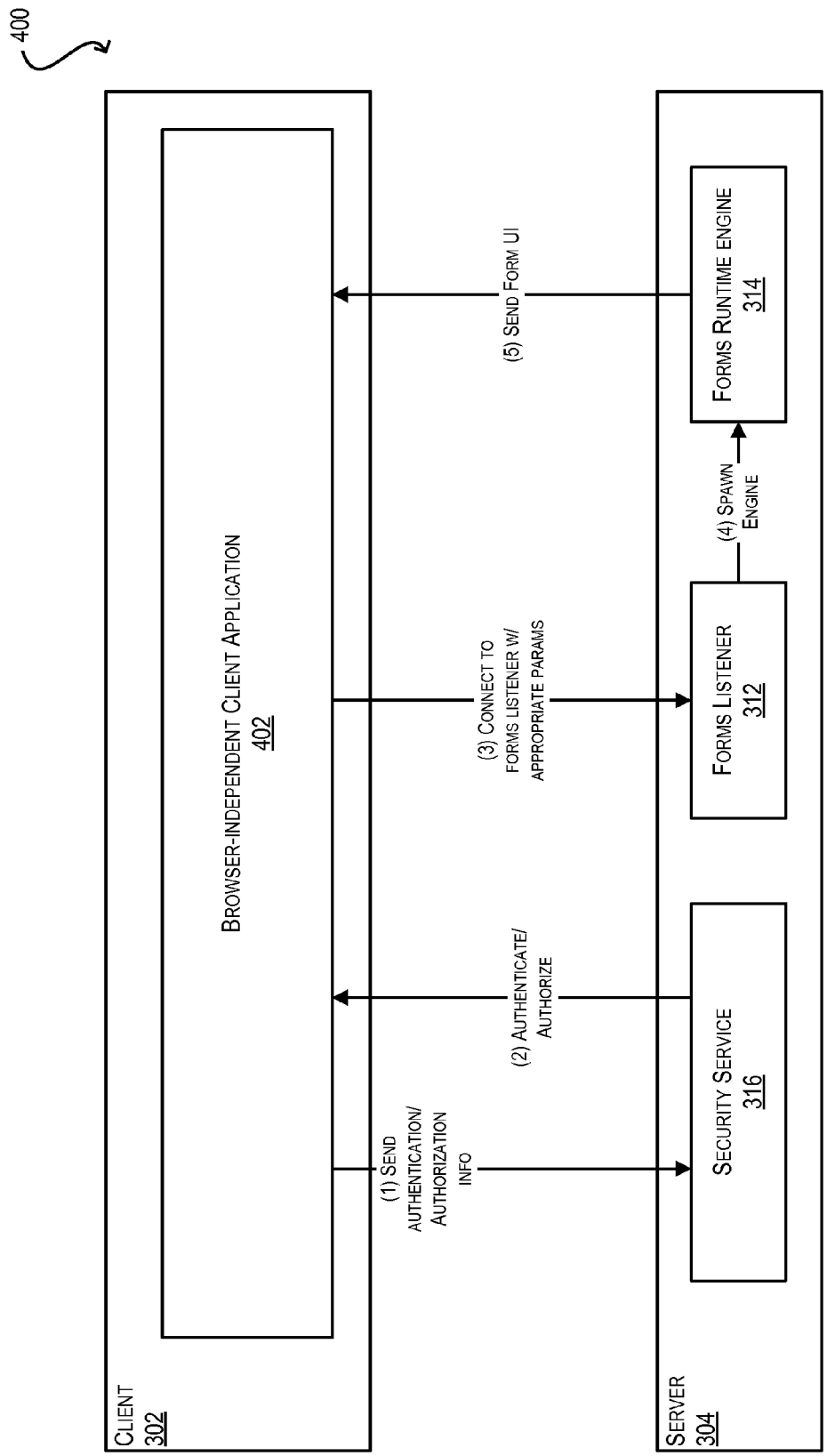
FIG. 4 is a flow diagram illustrating steps performed in establishing a session between a browser-independent client application and a server component of an Oracle Forms-based client-server application in accordance with an embodiment of the present invention.

FIG. 4 is a flow diagram 400 illustrating the steps performed in establishing a session between a browser-independent client application 402 and a server component of an Oracle Forms-based client-server application in accordance with an embodiment of the present invention. In an embodiment, browser-independent client application 402 is created by converting thin client 308 via the processing of flowcharts 100 and 200. Flow diagram 400 illustrates how the browser dependencies depicted in flow diagram 300 are eliminated when using browser-independent client application 402 rather than thin client 308.

At steps (1) and (2), browser-independent client application 402 interacts directly with security service 316 to authenticate and/or authorize a user. In one set of embodiments, this is performed by calling the authentication and/or authorization APIs of the authentication and authorization handlers described with respect to FIG. 2. Since this interaction is performed directed by browser-independent client application 402, the dependency on web browser 306 to handle security is eliminated.

At step (3), browser-independent client application 402 connects with Forms listener 312. As part of this process, browser-independent client application 402 is configured to send appropriate execution parameters to Forms listener 312. In this manner, the dependency on web browser 306 to receive and pass parameters is also eliminated.

Finally, at steps (3) and (4), Forms runtime engine 314 is spawned and sends the appropriate Forms UI to browser-independent client application 402. Although not shown in FIG. 4, application 402 may also take care of requesting and loading any files needed by the application at runtime, thereby eliminating the need to request, for example, applet files via web browser 306 as shown in flow diagram 300.

Figure 5:
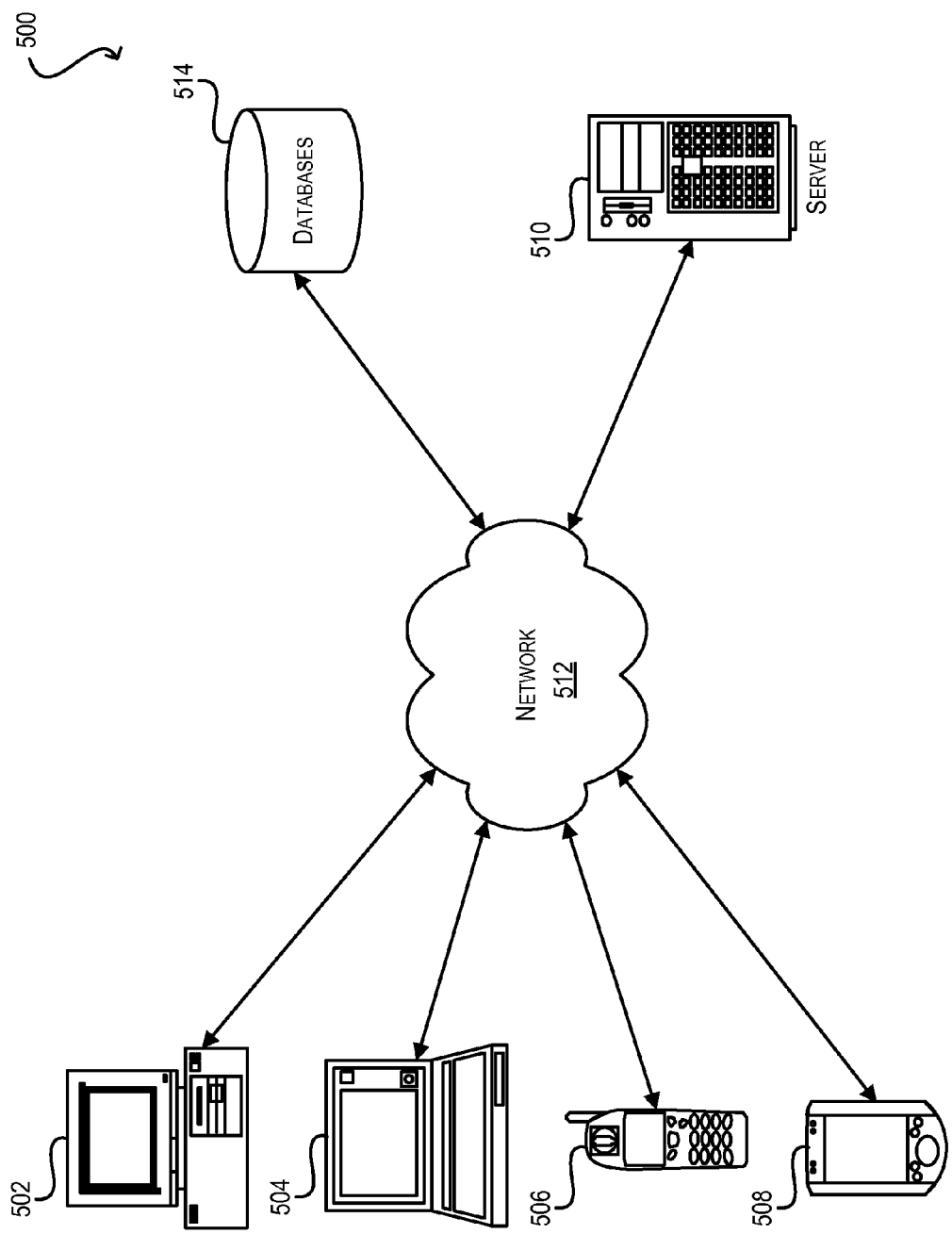
FIG. 5 is a simplified block diagram illustrating a runtime system environment that may be used in accordance with an embodiment of the present invention.

FIG. 5 is a simplified block diagram illustrating components of a runtime system environment 500 that may be used in accordance with an embodiment of the present invention. As shown, runtime system environment 500 includes one or more client computing devices 502, 504, 506, 508 and a server 510. In one set of embodiments, client computing devices 502, 504, 506, 508 are configured to run a client component of a client-server application, such as browser-independent client application 402 of FIG. 4. Further, server 510 is configured to run one or more server and/or middle-tier components of the client-server application, such as components 312, 314, 316 of FIG. 4. Although runtime system environment 500 is shown with four client computing devices and one server, any number of client computing devices and servers may be supported.

Client computing devices 502, 504, 506, 508 may be general purpose personal computers (including, e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 502, 504, 506, 508 may be any other electronic device capable of communicating over a network (e.g., network 512 described below) with server 510.

Server 510 may be a general purpose computer, specialized server computer (including, e.g., a LINUX server, UNIX server, mid-range server, mainframe computer, rack-mounted server, etc.), server farm, server cluster, or any other appropriate arrangement and/or combination. Server 510 may run an operating system including any of those discussed above, as well as any commercially available server operating system. Server 510 may also run any of a variety of server applications and/or mid-tier applications, including web servers, JAVA virtual machines, application servers, database servers, and the like. As indicated above, in one set of embodiments, server 510 is adapted to run one or more server and/or middle-tier components that are configured to receive and service requests from client computing devices 502, 504, 506, 508.

As shown, client computing devices 502, 504, 506, 508 and server 510 are communicatively coupled via a network 512. Network 512 may be any type of network that can support data communications using any of a variety of commercially-available protocols, including without limitation TCP/IP, SNA, IPX, AppleTalk, and the like. Merely by way of example, network 514 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Runtime system environment 500 may also include one or more databases 514. For instance, databases 514 may include an application database configured to store transactional data for a client-server application running on server 510 and client computing devices 502, 504, 506, 508, as well as any other type of database or data storage component discussed in the present disclosure. Databases 514 may reside in a variety of locations. By way of example, one or more of databases 514 may reside on a storage medium local to (and/or resident in) one or more of the computers 502, 504, 506, 508, 510. Alternatively, databases 514 may be remote from any or all of the computers 502, 504, 506, 508, 510 and/or in communication (e.g., via network 512) with one or more of these. In one set of embodiments, databases 514 may reside in a storage-area network (SAN) familiar to those skilled in the art. Similarly, any necessary files for performing the functions attributed to the computers 502, 504, 506, 508, 510 may be stored locally on the respective computer and/or remotely, as appropriate. In one set of embodiments, databases 514 may include relational databases, such as Oracle 10g, that are adapted to store, update, and retrieve data in response to SQL-formatted commands.

Figure 6:
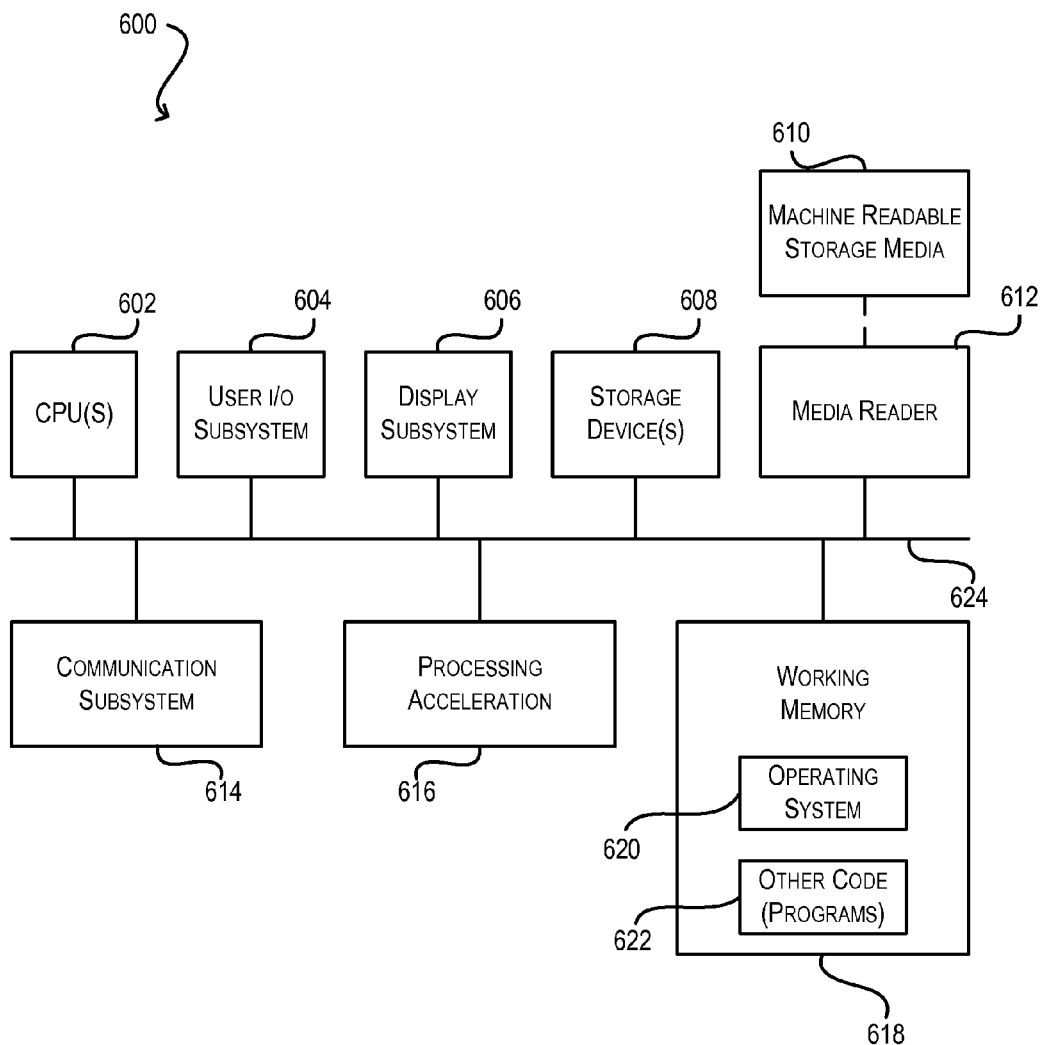
FIG. 6 is a simplified block diagram illustrating a computer system that may be used in accordance with an embodiment of the present invention.

FIG. 6 illustrates an exemplary computer system 600 that may be used in accordance with an embodiment of the present invention. In one set of embodiments, computer system 600 may be used to implement any of the computers 502, 504, 506, 508, 510 in runtime system environment 500 described above. Additionally, computer system 600 may be a development machine that is used to convert, at design time, a browser-based thin client into a browser-independent client application as described with respect to FIGS. 1 and 2 above. As shown, computer system 600 comprises hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). Computer system 600 may also include one or more storage devices 608. By way of example, the storage device(s) 608 may include devices such as magnetic disk drives, optical storage devices, and solid-state storage devices (e.g., random access memory (RAM), read-only memory (ROM), solid-state hard drives, etc.), which can be programmable, flash-updateable and/or the like.

Computer system 600 may additionally include a machine-readable storage media reader 612, a communications subsystem 614 (e.g., a modem, a network card (wireless or wired), an infra-red communication device, etc.), and working memory 618, which may include RAM and ROM devices as described above. In some embodiments, computer system 600 may also include a processing acceleration unit 616, which can include a digital signal processor (DSP), a special-purpose processor, and/or the like.

Machine-readable storage media reader 612 can further be connected to a machine-readable storage medium 610, together (and, optionally, in combination with storage device(s) 608) comprehensively representing remote, local, fixed, and/or removable storage devices/media for temporarily and/or more permanently containing machine-readable information. Communications system 614 may permit data to be exchanged with network 512 and/or any other computer described above with respect to runtime system environment 500.

Computer system 600 may also comprise software elements, shown as being currently located within working memory 618, including an operating system 620 and/or other code 622, such as an application program (which may be a client application, Web browser, mid-tier application, RDBMS, etc.). It should be appreciated that alternative embodiments of computer system 600 may have numerous variations from that described above. For example, customized hardware might also be used and/or particular elements might be implemented in hardware, software, or both. Further, connection to other computing devices such as network input/output devices may be employed.

Storage media and machine-readable media for containing code, or portions of code, can include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

While the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for facilitating the reuse of a browser-based thin client of a client-server application in a browser-independent context, the method comprising:
   receiving, by a computer system, first program code for the browser-based thin client, wherein the first program code has one or more browser dependencies that require the browser-based thin client to operate within a web browser in order to interact with a server side of the client-server application, wherein the one or more browser dependencies comprise one or more dependencies that require the browser-based thin client to depend on the web browser to handle application security when interacting with the server side of the client-server application; and
   converting, by the computer system, the first program code for the browser-based thin client into second program code for a browser-independent client application that is a rich-client application configured to be invoked and run from a rich-client infrastructure,
   wherein the converting comprises generating additional program code based at least in part on the first program code, the additional program code to be included in the second program code to facilitate reuse of the browser-based thin client within the rich-client infrastructure,
   wherein the second program code does not contain the one or more browser dependencies, so that the browser-independent client application is no longer dependent on a presence of the web browser in order to function, and
   wherein the converting further comprises:
      determining, by the computer system, the one or more browser dependencies, the determining comprising identifying the one or more dependencies that require the browser-based thin client to depend on the web browser to handle application security when interacting with the server side of the client-server application; and
      eliminating, by the computer system, the one or more browser dependencies, the eliminating comprising eliminating the one or more dependencies that require the browser-based thin client to depend on the web browser to handle application security when interacting with the server side of the client-server application.

2. The method of claim 1, wherein the browser-based thin client is implemented as a JAVA applet or an ActiveX control.

3. The method of claim 2, wherein the browser-independent client application is a web service.

4. The method of claim 1, wherein the converting is performed without human intervention.

5. The method of claim 1, wherein eliminating the dependency on the web browser to handle said application security comprises:
   creating an authentication handler in the browser-independent client application, wherein the authentication handler is configured to perform one or more authentication duties on behalf of the browser-independent client application that were previously performed by the web browser on behalf of the browser-based thin client; and
   creating an authorization handler in the browser-independent client application, wherein the authorization handler is configured to perform one or more authorization duties on behalf of the browser-independent client application that were previously performed by the web browser on behalf of the browser-based thin client.

6. The method of claim 5, wherein the one or more authentication duties include authenticating a user attempting to login to the client-server application.

7. The method of claim 5, wherein the one or more authorization duties include determining whether a user is authorized to perform a function via the client-server application.

8. The method of claim 5, wherein the authentication handler includes a generic authentication Application Programming Interface, wherein the authorization handler includes a generic authorization Application Programming Interface, and wherein a main process of the browser-independent client application is configured to automatically call the generic authentication Application Programming Interface or the generic authorization Application Programming Interface when authentication or authorization is required.

9. The method of claim 8, wherein the generic authentication Application Programming Interface and the generic authorization Application Programming Interface are configured to invoke one or more external security Application Programming Interfaces that are external to the browser-independent client application.

10. The method of claim 9, wherein the one or more external security Application Programming Interfaces include an authentication operation provided by an external identity service.

11. The method of claim 1, wherein the browser-based thin client is dependent on the web browser to download and cache one or more files necessary for accessing the server side of the client-server application, and wherein eliminating the one or more browser dependencies further comprises eliminating the dependency on the web browser to download and cache said one or more files.

12. The method of claim 11, wherein the one or more files include a JAVA Archive (JAR) file.

13. The method of claim 1, wherein the browser-based thin client is dependent on the web browser to receive one or more execution parameters, and wherein eliminating the one or more browser dependencies further comprises eliminating the dependency on the web browser to receive said one or more execution parameters.

14. The method of claim 13, wherein the one or more execution parameters are selected from a list consisting of: performance-related parameters, user interface-related parameters, and login-related parameters.

15. A system for facilitating the reuse of a browser-based thin client of a client-server application in a browser-independent context, the system comprising:
   a storage component configured to store program code for the browser-based thin client; and
   a processing component in communication with the storage component, wherein the processing component is configured to:
      convert first program code for the browser-based thin client into second program code for a browser-independent client application that is a rich-client application configured to be invoked and run from a rich-client infrastructure,
      wherein the converting comprises generating additional program code based at least in part on the first program code, the additional program code to be included in the second program code to facilitate reuse of the browser-based thin client within the rich-client infrastructure,
      wherein the first program code has one or more browser dependencies that require the browser-based thin client to operate within a web browser in order to interact with a server side of the client-server application, wherein the one or more browser dependencies comprise one or more dependencies that require the browser-based thin client to depend on the web browser to handle application security when interacting with the server side of the client-server application, wherein the second program code does not contain the one or more browser dependencies, so that the browser-independent client application is no longer dependent on a presence of the web browser in order to function, and wherein the converting further comprises:
  determining the one or more browser dependencies, the determining comprising identifying the one or more dependencies that require the browser-based thin client to depend on the web browser to handle application security when interacting with the server side of the client-server application; and
  eliminating the one or more browser dependencies, the eliminating comprising eliminating the one or more dependencies that require the browser-based thin client to depend on the web browser to handle application security when interacting with the server side of the client-server application.

16. A non-transitory machine-readable medium for a computer system, the non-transitory machine-readable medium having stored thereon a series of instructions which, when executed by a processing component, cause the processing component to facilitate the reuse of a browser-based thin client of a client-server application in a browser-independent context by:
  receiving program code for the browser-based thin client, wherein the program code for the browser-based thin client has one or more browser dependencies that require the browser-based thin client to operate within a web browser in order to interact with a server side of the client-server application, wherein the one or more browser dependencies comprise one or more dependencies that require the browser-based thin client to depend on the web browser to handle application security when interacting with the server side of the client-server application; and
  converting the program code for the browser-based thin client into browser-independent program code for a rich-client application configured to be invoked and run from a rich-client infrastructure,
  wherein the converting comprises generating additional program code based at least in part on the program code, the additional program code to be included in the browser-independent program code to facilitate reuse of the browser-based thin client within the rich-client infrastructure, wherein the browser-independent program code does not contain the one or more browser dependencies, so that the browser-independent client application is no longer dependent on a presence of the web browser in order to function, and wherein the converting further comprises:
    determining the one or more browser dependencies, the determining comprising identifying the one or more dependencies that require the browser-based thin client to depend on the web browser to handle application security when interacting with the server side of the client-server application; and
    eliminating the one or more browser dependencies, the eliminating comprising eliminating the one or more dependencies that require the browser-based thin client to depend on the web browser to handle application security when interacting with the server side of the client-server application.

17. The method of claim 1 wherein the step of eliminating the one or more browser dependencies comprises:
  replacing code pertaining to the eliminated browser dependencies with browser-independent code, wherein the browser-independent code addresses functional dependencies of the first code with respect to its host web browser.

* * * * *

UNITED STATES PATENT AND TRADEMARK OFFICE
CERTIFICATE OF CORRECTION

| | | |
|---|---|---|
| PATENT NO. | : 8,996,658 B2 | Page 1 of 1 |
| APPLICATION NO. | : 12/203816 | |
| DATED | : March 31, 2015 | |
| INVENTOR(S) | : Anbuselvan | |

It is certified that error appears in the above-identified patent and that said Letters Patent is hereby corrected as shown below:

Title Page, item (56)

In page 4, column 1, under other publications, line 29, delete "dwrichangelog" and insert -- dwr/changelog --, therefor.

In page 4, column 1, under other publications, line 45, delete "orq/" and insert -- org/ --, therefor.

In page 4, column 1, under other publications, line 53, delete "Claypool2000" and insert -- Claypool2000 --, therefor.

In page 4, column 2, under other publications, line 59-61, delete "wi ndowsco n nected. co m/b logs/jerry/archive/2005/ 12/1 9/fi l e-and-reg istry-vi rtual izatio n-th e-good-th ebad- and-the-ugly.aspx>." and insert -- windowsconnected.com/blogs/jerry/archive/2005/12/19/file-and-registry-virtualization-the-good-the-bad-and-the-ugly.aspx>. --, therefor.

Signed and Sealed this
Tenth Day of November, 2015

Michelle K. Lee
*Director of the United States Patent and Trademark Office*